Patented Apr. 29, 1930

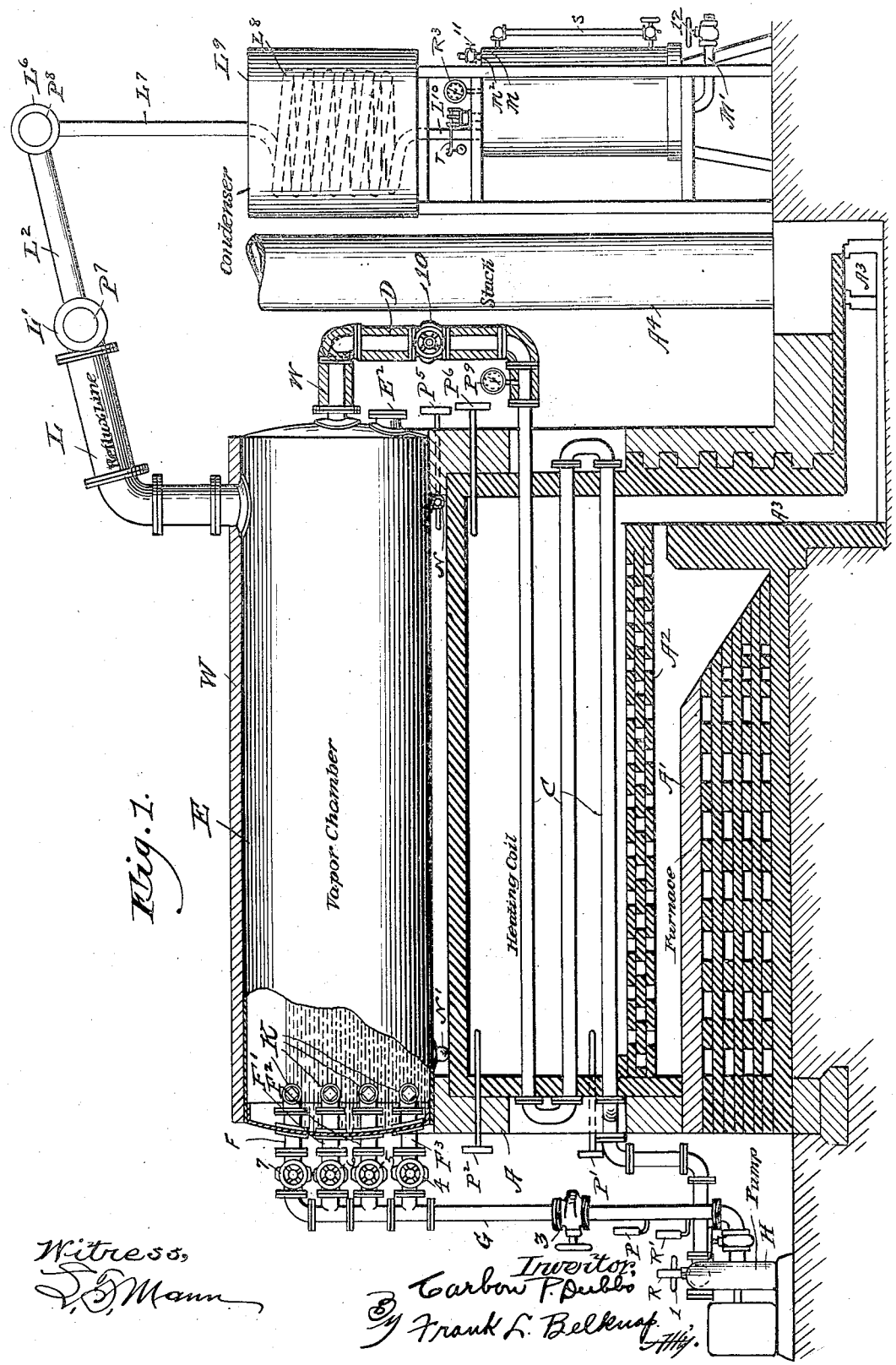

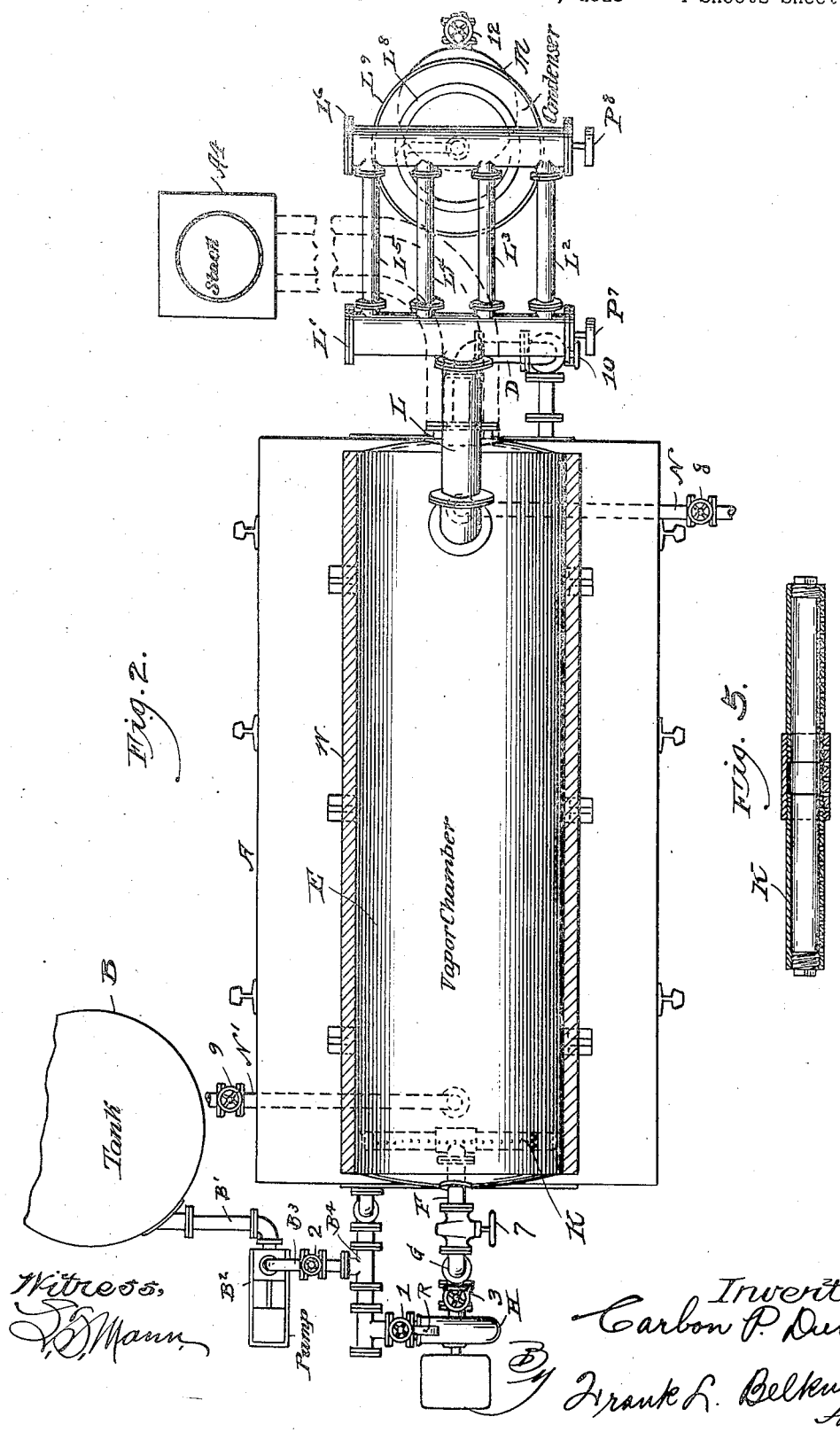

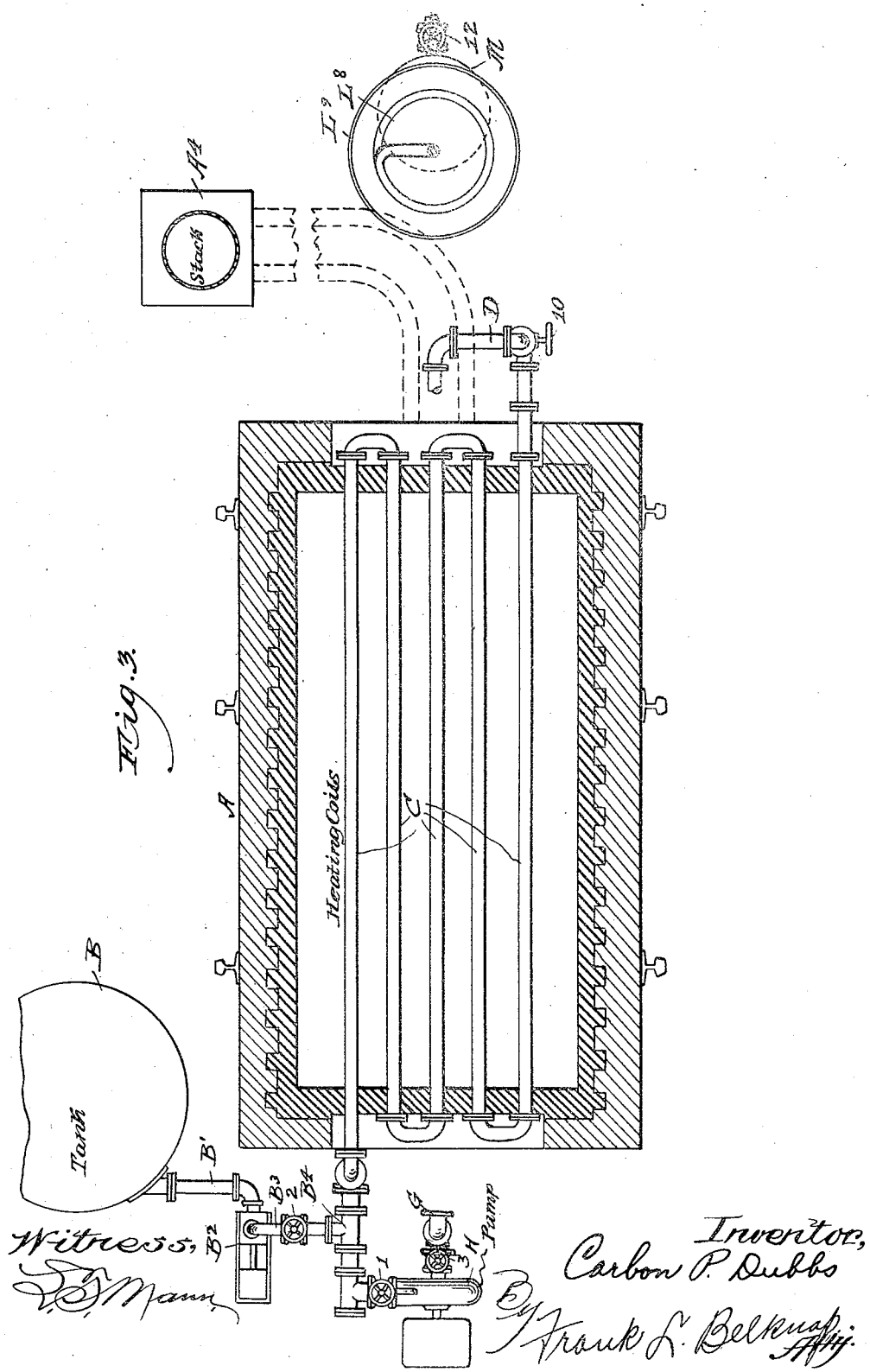

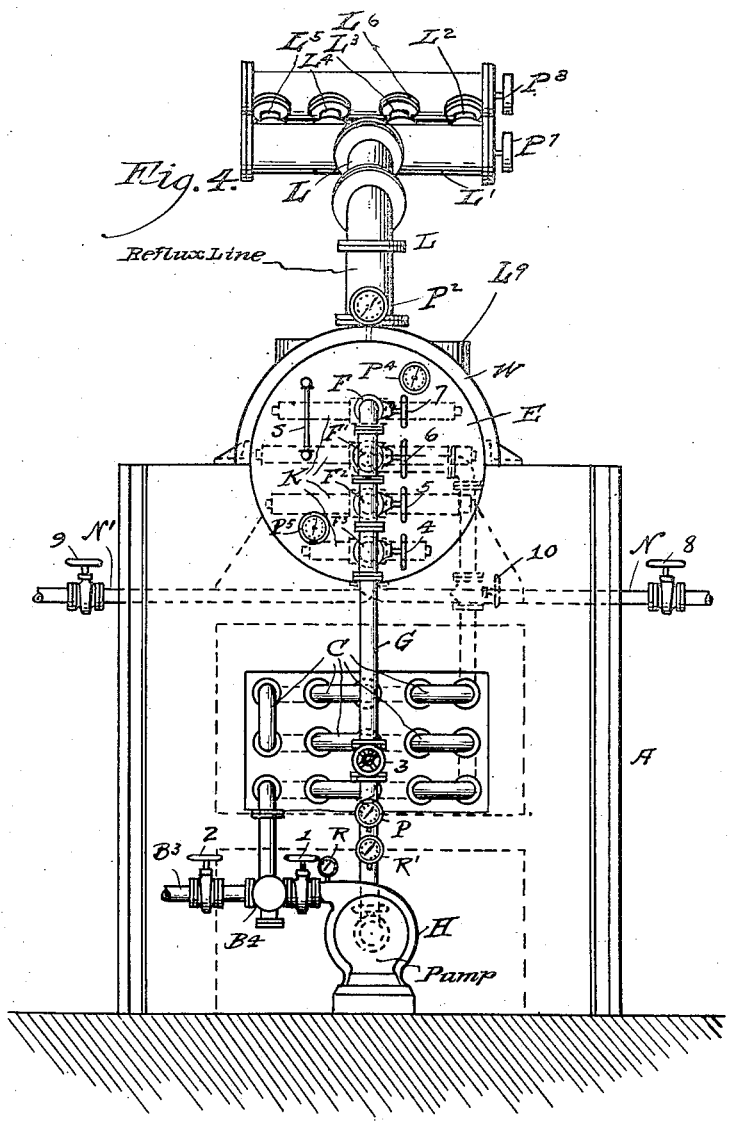

1,756,019

UNITED STATES PATENT OFFICE

CARBON P. DUBBS, OF WILMETTE, ILLINOIS, ASSIGNOR TO UNIVERSAL OIL PRODUCTS COMPANY, OF CHICAGO, ILLINOIS, A CORPORATION OF SOUTH DAKOTA

PROCESS FOR PRODUCING LOWER-BOILING-POINT HYDROCARBONS

Continuation of application Serial No. 260,956, filed November 4, 1918. This application filed January 14, 1925, Serial No. 2,449. Renewed January 22, 1929.

This invention relates to a method and apparatus for treating hydrocarbon oils to produce therefrom products having lower boiling points, and is a continuation of my co-pending application Serial No. 260,956, filed November 4, 1918.

The objects of the invention are, to provide a process and apparatus for separating oils of different boiling points; to provide a process and apparatus wherein the oil under treatment is circulated through a coil and then to and from a larger vapor chamber which vapor chamber is only partly filled with the oil, the oil being heated as it passes through the former coil and as it passes through the latter chamber, the oil being relieved of more or less of its vapor content, which vapors pass to and through a condenser while more or less of an insoluble material, such as carbon formed in the oil, settles and is drawn off while the remaining unvaporized oil passes from the larger chamber back to and through the heating tubes, the whole being maintained under pressure; to provide a process and apparatus in which the heating of the oil under treatment is accomplished in the heating coils and said oil maintained in rapid circulation in these coils and then discharged into one end of the vapor chamber, said chamber being only partially filled with the oil, and said oil withdrawn from said vapor chamber at the other end forced back through the heating coil, while more or less of the oil and carbon and other solids are drawn off as residuum, said vapor chamber being of such size in the cross-section as to greatly reduce the speed of the flow of the oil from one end to the other and said chamber being of such dimensons as to permit more or less of its solid content to settle out and means being provided for the drawing off of more or less of the solids that are thus settled out of the oil along with part of the oil and means provided for supplying fresh oil to the apparatus; to provide a process for continuous operation; to provide a process and apparatus in which those products that are only partly reduced or converted to the desired low boiling point, are returned and further circulated through the heating tubes; to provide a process and apparatus in which the vapors not having the desired low boiling points are condensed and automatically returned for further treatment; to provide a means whereby the free carbon produced can be settled out and removed without interrupting the operation of the process; to provide means whereby any settlement of carbon on the heating tubes will be indicated before the particular part of the apparatus where such carbon settled is injured; to provide in general a process and apparatus of the character referred to.

In the drawings,—

Figure 1 is a side elevation of the apparatus partly in section and partly broken away.

Fig. 2 is a plan view of the entire apparatus.

Fig. 3 is a plan view of the pump and the heating coils in that portion of the furnace that the heating coils are positioned in.

Fig. 4 is a one end view of the apparatus, and

Fig. 5 is a detailed cross sectional view of one of the perforated draw-off pipes mounted in the still.

Referring to the drawings, A is the furnace proper; $A^1$ is the fire tunnel; $A^2$ is the perforated arch wall; $A^3$ is the flue tunnel; $A^4$ is the flue. B is the supply tank; $B^1$ is line connecting supply tank to pressure pump $B^2$; $B^3$ is the discharge line of the pressure pump $B^2$, into manifold $B^4$ which connects with heating coils C, which discharge through line D into vapor chamber E. On the vapor chamber E is hand hole plate $E^2$. F, $F^1$, $F^2$ and $F^3$ are draw-off lines from the vapor chamber E and connect with suction line G which connects with pump H. K are perforated pipes on the ends of the draw-off lines F, $F^1$, $F^2$ and $F^3$. L is a vapor line connecting to header $L^1$ which header by means of pipes $L^2$, $L^3$, $L^4$ and $L^5$ connect with header $L^6$ and which header by means of line $L^7$ connects with water cooled condenser $L^8$ positioned in tank $L^9$. The water-cooled condenser by means of line $L^{10}$ connects with tank M which has draw-off line $M^1$, and gas discharge line $M^2$. On the bottom of the vapor chamber E are draw-off lines N and $N^1$. P, $P^1$, $P^2$, $P^3$, $P^4$, $P^5$, $P^6$, $P^7$, $P^8$ and $P^9$ are pyrometers. R, $R^1$, $R^3$ are pressure gauges. S and S¹ are glass liquid gauges. T is a pressure regulating valve. W is lagging around the vapor chamber E and connecting pipes D to prevent excessive loss of heat by radiation. 1 to 12 inclusive are valves.

Describing now the operation of the process, the oil to be treated is drawn from tank B through line B¹, into pump B² and is there forced through the line B³ into manifold B⁴ through heating coils C positioned in the furnace A, through line D into the end of the vapor chamber E. The vapors generated pass up through inclined line L through manifold L¹ through lines L², L³, L⁴ and L⁵ into manifold L⁶ and the vapors condensed therein are automatically drained back into vapor chamber E and subjected to further treatment. The remaining vapors are drawn from manifold L⁶ through line L⁷ through water-cooled condenser L⁸ through line L¹⁰ into receiving tank M and condensate is drawn from there either continuously or intermittently through line M¹ through valve 12. Any excess incondensable gas accumulated in tank M is either automatically discharged through pressure regulating valve T or through line M² by manipulating valve 11. The oil remaining in the vapor chamber E is drawn off through one of the four perforated suction lines marked K by opening either one of the valves marked, 4, 5, 6, 7 and drawn through line G into suction of pump H and there forced back through the heating coils at such velocity as is found suitable for the best results. The residuum collected in the vapor chamber E is drawn off through line N and N¹ or both either continuously or intermittently and the oil fed into the apparatus by means of pressure pump B² either continuously or intermittently.

It will be seen by this arrangement that the oil while passing through the heating coils C can be kept at such velocity as to prevent the carbon or other solid matters from depositing or adhering to the inside walls of the coils and as the same oil passes through the vapor chamber E, it is at a much slower rate of speed and thence will not carry in suspension as great a volume of solid matters and this will cause the excess to be precipitated out in the vapor chamber E.

The important point in this process is in maintaining a certain ratio of volume of oil to volume of vapor space in the vapor chamber E and this is governed by the valves 4, 5, 6 and 7, the particular valve corresponding to the particular height of liquid desired in the retort E being open, the other valves being shut. The height of the oil in the vapor chamber E will also govern the rate of speed that the oil will flow from one end to the other end and this in turn will have a direct bearing on the amount of solid matter that will be precipitated out of said oil as it passes from one end of the vapor chamber E to the other end. The arrangement of the discharge and intake in the vapor chamber E is such as to always form a pocket in the said vapor chamber in which the solid matter settles and accumulates and more or less of such is drawn off with the residuum.

It will be understood that in some cases it will be more economical to use a higher oil level in the vapor chamber E than in other cases as it would be also more economical in some cases to use a lower velocity in the heating tubes and distill off a smaller percentage of gasoline while in other cases it will be more advantageous commercially to distill off a larger volume of gasoline from a given quantity of oil and which will necessitate a higher velocity at which the oil will travel to the heating tubes. The entire system is subjected to a pressure either vapor or gas or otherwise created which pressure will range from 50 to 500 lbs. per square inch with pressure unit varying in accordance with conditions to be met. The temperature at which the oil is to be heated will vary approximately from 400° F., to 1200° F., although these limits are not arbitrary in either case. By this arrangement, a much hotter furnace temperature can be used in the furnace and a more economical fuel consumption obtained.

The cracking or heating tubes are preferably of the size from 2 inches to 4 inches in diameter. The expansion chamber may be of a size anywhere from 20 inches to 48 inches in diameter.

The following illustrative run of the described apparatus in accordance with my process is as follows:

Gas oil from a midcontinent crude, such as Kansas or Oklahoma oils, such as 32 to 36 Baumé gravity, is continuously supplied to the heating coils where it is subjected to a temperature of from 500° to 1200° F., and the oil then discharged to a vapor chamber. From this vapor chamber the vapors pass on to a condenser, a pressure of from 50 to 500 pounds per square inch being maintained on the system.

I claim as my invention:

A continuous process for treating hydrocarbon oils, consisting in continuously charging a stream of raw oil under a mechanical pressure to and through a heating coil wherein the oil is subjected to a cracking temperature, in discharging the heated oil constituents from said coil into an enlarged vapor chamber wherein substantial conversion of the oil occurs, in dephlegmating the evolved vapors, in condensing and collecting the dephlegmated vapors, in continuously withdrawing heavy carbon-containing residual oil from said vapor chamber, in continuously forcing light unvaporized residual oil from said vapor chamber under a mechanical pressure to said stream of raw oil to be passed therewith through said heating coil for retreatment, and in maintaining a definite ratio of the volume of oil to the volume of vapor space in said vapor chamber by regulating the level from which the light residual oil in the vapor chamber is withdrawn.

CARBON P. DUBBS.